EMITTER-FOLLOWER CIRCUIT STABILIZED TO PREVENT OSCILLATIONS
Filed Oct. 25, 1967 2 Sheets-Sheet 1
FIG. 1
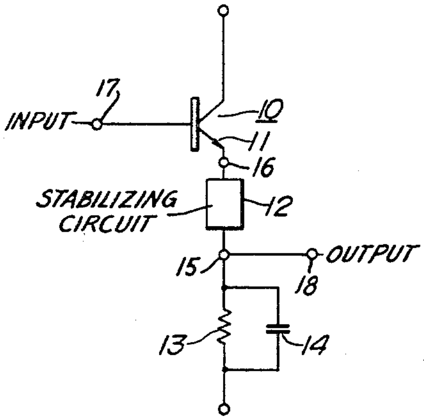
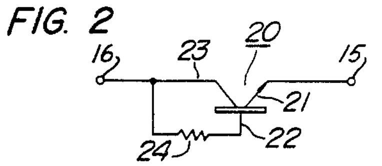
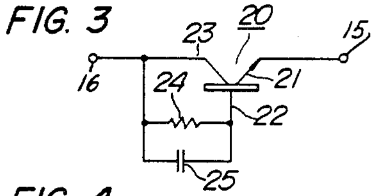
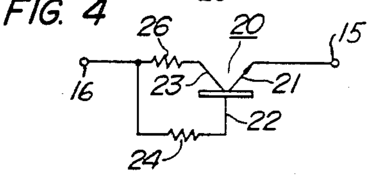
FIG. 5
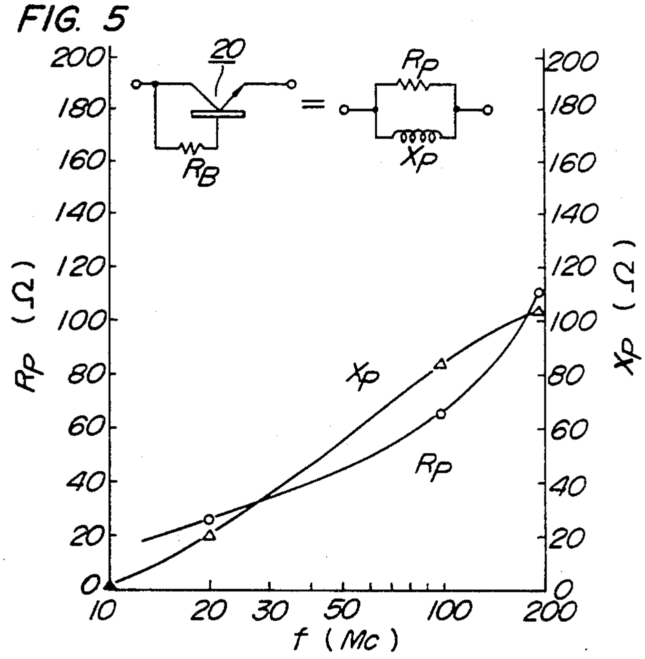
INVENTORS
ICHIRO MIWA
TAKAHIDE IKEDA
BY Craig & Antonelli
ATTORNEYS

INVENTORS
ICHIRO MIWA
TAKAHIDE IKEDA

BY Craig & Antonelli
ATTORNEYS

United States Patent Office 3,471,793

Patented Oct. 7, 1969

3,471,793

EMITTER-FOLLOWER CIRCUIT STABILIZED TO PREVENT OSCILLATIONS

Ichiro Miwa, Tokyo, and Takahide Ikeda, Kokubunji-shi, Japan, assignors to Hitachi, Ltd., Tokyo, Japan, a corporation of Japan Filed Oct. 25, 1967, Ser. No. 677,898
Claims priority, application Japan, Oct. 28, 1966, 41/70,695
Int. Cl. H03f 3/42
U.S. Cl. 330—18 6 Claims

ABSTRACT OF THE DISCLOSURE

This specification discloses an emitter-follower circuit, comprising a first transistor constituting the emitter-follower circuit, and a second transistor having the base thereof connected with the collector thereof through a resistance to form a two-terminal circuit, wherein said second transistor is connected between the emitter and the emitter load of said first transistor to prevent an oscillation or ringing from occurring in a high frequency region, thereby ensuring stable operation.

BACKGROUND OF THE INVENTION

This invention relates to an emitter-follower circuit, and more particularly it pertains to an emitter-follower circuit wherein an oscillation, ringing or the like can be prevented from occurring in a high frequency region without making the delay time of a pulse signal too long and by an arrangement which can be constructed in the form of an integrated circuit.

Emitter-follower circuit, which has become an essential element to the high speed logic circuit and the like of an electronic computer, is suited to a high-speed operation. However, it has a drawback that such trouble as oscillation, ringing or the like often tends to occur therein. This is due to the fact that the resistance component of the output impedance of the emitter follower circuit represents a negative resistance and the reactance component thereof becomes inductive in a certain high frequency region (normally, several 10 mHz. to several 100 mHz.) because of the base inductance and the phase shift of the current amplification factor so that a condition for oscillation is established in the presence of a capacitive emitter load.

Therefore, the simplest method of stabilizing such emitter-follower circuit is to connect a sufficient resistance to neutralize the aforementioned negative resistance to the emitter thereof. In case a mere resistance element is employed for stabilizing the emitter-follower circuit, however, a large resistance which has sufficient value to neutralize the negative resistance in a high frequency region exists in the emitter circuit in a low frequency region, so that it results greatly in reducing the amplitude of an output pulse and increasing the delay time.

From this, it will be seen that an element connected with the emitter of an emitter-follower circuit to stabilize the latter is desirably an element representing a high resistance in a high frequency region in which a negative resistance is caused and a lower resistance in a low frequency region in which a stable operation is effected. In case said element has a reactance component, it is desired that such reactance component be inductive.

Various proposals have heretofore been made to stabilize the emitter-follower circuit. Among those proposals, the most effective one is that a parallel circuit of a resistance and an inductance is connected in series with the emitter of the emitter-follower circuit. Such parallel circuit has a characteristic close to that of the aforementioned desirable stabilizing element.

With the above arrangement, however, an inductance is needed as a constitutional element, which is technically difficult to be produced in the form of an integrated circuit. Therefore, such arrangement cannot be applied to a high speed logic circuit or the like which is often constructed as an integrated circuit recently.

Consequently, there has been a great desire for a proposal of a novel emitter-follower stabilizing arrangement to which an integrated-circuit technique can be conveniently applied.

These and other objects, features and advantages of this invention will become apparent from the following description taken in conjunction with the accompanying drawings.

SUMMARY OF THE INVENTION

It is a primary object of this invention to provide an emitter-follower circuit capable of being applied to an integrated circuit arrangement and having an improved stability.

Another object of this invention is to provide an emitter-follower circuit stabilizing arrangement which is versatile in respect of frequency range.

Still another object of this invention is to provide an emitter-follower circuit stabilizing arrangement capable of stabilizing the operation of such emitter-follower circuit without making the delay time of a pulse signal too long and adapted for application to a high speed logic circuit or the like.

BRIEF DESCRIPTION OF THE DRAWINGS

FIGURE 1 is a schematic diagram showing an emitter-follower circuit having a two-terminal circuit connected with the emitter thereof to stabilize the operation of the emitter-follower circuit;

FIGURE 2 is a view showing the basic form of two-terminal circuit used to stabilize an emitter-follower circuit in accordance with this invention;

FIGURES 3, 4 and 7 are views showing modified forms of the two-terminal circuit in accordance with this invention, respectively;

FIGURE 5 is a view showing the characteristics of the basic form of two-terminal circuit as shown in FIGURE 2.

DESCRIPTION OF THE PREFERRED EMBODIMENTS

Figure 6:
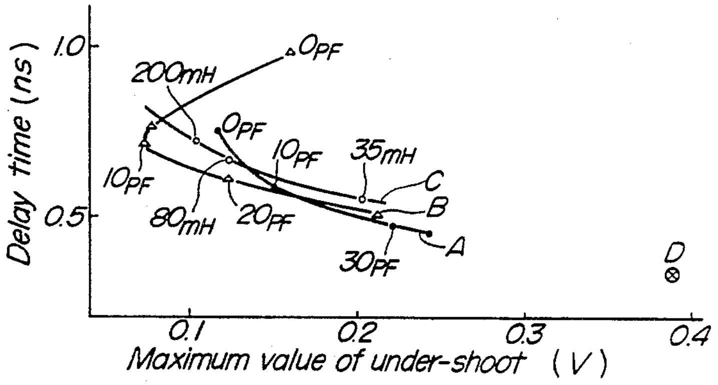
FIGURE 6 is a view showing the pulse response of the emitter-follower circuit according to this invention in comparison with that of a conventional circuit of this type.

In accordance with this invention, a two-terminal stabilizing circuit means 12 having two terminals 15 and 16 is connected between the emitter 11 of an emitter-follower transistor 10 and the emitter load 13, 14, as shown in FIGURE 1. The emitter-follower circuit of this invention is characterized in that a transistor circuit arranged in the form of a two-terminal circuit as shown in FIGURES 2, 3, 4 and 7 is used as the stabilizing circuit means. In FIGURE 1, the reference numeral 13 represents an emitter load resistance, 14 a load capacitance, 17 an input terminal connected to the base of the emitter-follower transistor 10, and 18 an output terminal connected between the stabilizing circuit means 12 and the emitter load resistor 13.

Referring to FIGURE 2, the two-terminal circuit comprises a transistor 20 having an emitter 21, base 22 and collector 23, and a resistor 24, the emitter 21 being connected with said one terminal 15, the base 22 being connected with the other terminal 16 through the resistance 24, and the collector 23 being connected with the other terminal 16. It is known that such two-terminal circuit is inductive. As a result of the examination of the resistance component of the two-terminal circuit, it has been found that the higher the frequency in use, the more increases such resistance component. FIGURE 5 shows the frequency response of the impedance of the above two-terminal circuit. In this figure, the vertical axis shows the resistance $R_P(\Omega)$ and reactance $X_P(\Omega)$ of an equivalent circuit of the two-terminal circuit as the value $R_B$ of the resistance 24 connected with the base of the transistor 20 is set to 500Ω, and the horizontal axis indicates the frequency. From the frequency response variations, it will be seen that the two-terminal circuit using the transistor 20 as shown in FIGURE 2 meets the requirements for the aforementioned stabilizing circuit means 12 to be connected with the emitter-follower transistor to stabilize the emitter-follower circuit. In addition, an integrated-circuit technique can be applied to the transistor constituting this two-terminal circuit. Thus, the emitter-follower circuit having the above-mentioned two-terminal circuit connected with the emitter in accordance with this invention can easily be constructed as an integrated circuit.

Parameters having great effect on the frequency resonse of the impedance of the two-terminal circuit as shown in FIGURE 2 are the current amplification factor $\alpha_O$, current gain band-width product $f_T$ and base resistance $R_B$ of the transistor 20. The higher the base resistance $R_B$, the higher becomes the impedance of said two-terminal circuit as a whole. The lower the current amplification factor $\alpha_O$, the higher becomes the resistance in the low frequency region. The lower the current gain band-width product $f_T$, the lower the frequency at which the impedance begins to be increased. Thus, in accordance with this invention, circuit design adapted for any intended application becomes possible by changing such parameters. By making $\alpha_O$ and $f_T$ lower, it is possible to restrain oscillation from occurring in the emitter-follower circuit in which oscillation tends to be caused at a relatively low frequency. FIGURE 4 shows the case where a resistance 26 is connected between the terminal 16 and the collector 23 of the transistor 20 so that $\alpha_O$ and $f_T$ can be changed equivalently. That is, with increase in the resistance 26, the base junction becomes substantially forward-biased so that the transistor is rendered to operate in a region close to its saturation region with a result that $\alpha_O$ and $f_T$ are decreased. In this case, it has been experimentally confirmed that the values of $\alpha_O$ and $f_T$ can be determined by the resistances 24 and 26 and the saturation characteristic of the transistor 20, and that they are not substantially influenced by the emitter current.

Figure 7:
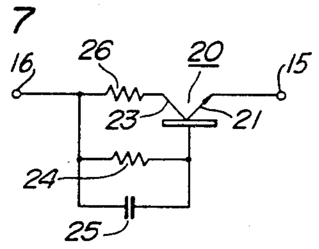

Referring to FIGURE 3, there is shown a two-terminal circuit in which a capacitance element 25 is connected in parallel with the base resistance 24. The capacitance element 25 forms a by-pass for the resistance 24 in the higher frequency region. The impedance of the two-terminal circuit is low when the frequency is lower, while it becomes high when a high frequency at which oscillation tends to occur is reached. In a still higher frequency region in which there is no possibility that oscillation occurs, the impedance becomes low again. Thus, the two-terminal circuit described above operates effectively only in the frequency region in which oscillation tends to occur in the emitter-follower circuit, without increasing the delay time. In the case where the above two-terminal circuit is applied to the emitter-follower circuit as shown in FIGURE 1 and the value of the capacitance 25 connected in parallel with the base resistance 24 is varied, the amount of the delay time and ringing of an output pulse can be adjusted, which will be seen from an example of the measurement results concerning the pulse response of the emitter-follower circuit as shown by characteristic curves A and B of FIGURE 6. In this figure, the delay time is shown on the vertical axis, and the maximum under-shoot of an output pulse is indicated on the horizontal axis. The curves A and B were obtained by setting the base resistance 24 to 220Ω and suitably changing the capacitance 25. In FIGURE 6, the curve C shows the pulse response of a conventional circuit using a parallel circuit of a resistance as low as 11KΩ, for example, and an inductance as the latter is changed. The letter D indicates the case where no stabilizing means is added to the emitter-follower circuit. This effect of the capacitance can likewise be produced by applying such capacitance to the two-terminal circuit as shown in FIGURE 4 to form such a circuit arrangement as shown in FIGURE 7.

As described above, in accordance with this invention, a two-terminal stabilizing circuit means is constituted by combining a resistance or a resistance and capacitance with a transistor, and such two-terminal stabilizing circuit means is connected between the emitter of an emitter-follower transistor and the emitter load, thereby stabilizing the operation of the emitter-follower circuit. Thus, the stabilized emitter-follower circuit according to this invention can be constructed as semiconductor integrated circuit, and it can be effectively applied to a high speed logic circuit or the like.

We claim:

1. A stabilized emitter-follower circuit comprising an emitter-follower transistor, a load connected with the emitter of said emitter-follower transistor, and stabilizing circuit means comprising:

- a further stabilizing transistor having an emitter, a base and a collector for stabilizing said emitter-follower circuit;
- a first terminal connected with the emitter of said stabilizing transistor;
- a second terminal connected with the collector of said stabilizing transistor;
- a resistor connected between said second terminal and the base of said stabilizing transistor; and
- means for connecting said stabilizing transistor between the emitter of said emitter-follower transistor and said load in the operative direction of said stabilizing transistor through said first and second terminals to thereby prevent oscillation, ringing or similar undesirable operations from occurring in the emitter-follower circuit over a wide range of operating frequencies.

2. A stabilized emitter-follower circuit as defined in claim 1 wherein the circuit is fabricated in integrated circuit form.

3. A stabilized emitter-follower circuit as defined in claim 1 wherein said stabilizing circuit means further comprises an additional resistor connected between the collector of said stabilizing transistor and said second terminal.

4. A stabilized emitter-follower circuit as defined in claim 1 wherein said stabilizing circuit means further comprises a capacitor connected in parallel with said resistor connected between said second terminal and the base of said stabilizing transistor.

5. A stabilizing emitter-follower circuit as defined in claim 4 wherein said stabilizing circuit means further comprises an additional resistor connected between the collector of said stabilizing transistor and said second terminal.

6. A stabilized emitter-follower circuit as defined in claim 5 wherein the circuit is fabricated in integrated circuit form.

References Cited

UNITED STATES PATENTS 3,136,928 6/1964 Avis ____________ 330—18 X

ROY LAKE, Primary Examiner

S. H. GRIMM, Assistant Examiner

U.S. Cl. X.R.

330—20, 27, 31, 32